United States Patent [19]

Yamamoto et al.

[11] Patent Number: 4,719,689

[45] Date of Patent: Jan. 19, 1988

[54] METHOD OF MAKING A RUST PREVENTIVE HEMMED JOINT BETWEEN TWO METAL PANELS

[75] Inventors: Shozo Yamamoto, Fujisawa; Tsuneo Sakauchi; Tadashi Ashida, both of Yokohama; Koichi Handa, Miura; Masao Nakajima, Yokosuka, all of Japan

[73] Assignee: Nissan Motor Co., Ltd., Japan

[21] Appl. No.: 937,481

[22] Filed: Dec. 3, 1986

[30] Foreign Application Priority Data

Dec. 4, 1985 [JP] Japan .................................. 60-273748

[51] Int. Cl.⁴ .............................................. B23P 25/00
[52] U.S. Cl. ...................................... 29/458; 29/527.1;
29/DIG. 29; 156/295; 264/271.1; 264/299;
296/29
[58] Field of Search ............... 29/458, 527.1, 527.2,
29/DIG. 29; 156/295; 264/239, 249, 271.1,
299; 296/29

[56] References Cited

U.S. PATENT DOCUMENTS 3,821,052 6/1974 Tanzer ............................ 156/295 X 4,679,290 7/1987 Adell ................................. 29/458 X

FOREIGN PATENT DOCUMENTS 52-6310 1/1977 Japan .
52-48214 4/1977 Japan .

*Primary Examiner*—Howard N. Goldberg
*Assistant Examiner*—Ronald S. Wallace
*Attorney, Agent, or Firm*—Leydig, Voit & Mayer

[57] ABSTRACT

In making a peripheral joint between first and second metal panels such as, e.g., outer and inner panels of an automobile door by hemming the first panel after application of a rust preventive sealant, the sealant is used in a quantity in excess of just sufficiency for completely filling in gaps in the joint to ensure that the excess portion of the sealant is pressed out of the joint by the end of the hemming operation, and the press die member used in the hemming working is formed with a groove in its hemming surface such that the sealant pressed out of the joint is confined within a space defined by the groove and shaped in conformance with the shape of the groove so as to serve as an external seal which closely covers the edge of the hemmed marginal part of the first panel.

2 Claims, 8 Drawing Figures

METHOD OF MAKING A RUST PREVENTIVE HEMMED JOINT BETWEEN TWO METAL PANELS

BACKGROUND OF THE INVENTION

This invention relates to a method of making a rust preventive peripheral joint between two metal panels by hemming working with application of a rust preventive sealant.

In the manufacture of automobile body components such as doors, hoods and trunk lids it is usual to make a peripheral joint between outer and inner panels of sheet steel by hemming the outer panel along an edge thereof so as to hem in a marginal part of the inner panel, and it is also usual to apply a rust preventive sealant so as to fill in the gaps in the joint with the sealant. Ordinarily the rust preventive sealant is applied to the outer panel so as to form a series of beads of the sealant along and at a short distance from the panel edge before placing the inner panel in the jointing position. At the hemming stage the precedingly applied sealant is forced to spread over the lapped marginal areas of the outer and inner panels. After completing the jointing operation the assembly of the outer and inner panels is undercoated by an electrodeposition coating process including a pretreatment, and then intermediate coating and finish coating are accomplished successively.

The rust preventive sealant is used primarily for affording corrosion resistance to the mating panel surfaces in the hemmed joint in compensation for insufficiency of the protective effect of the electrodeposition undercoating treatment in the joint, and also for augmenting physical strength of the joint. To fully accomplish such purposes it is desired that the gaps between the panel surfaces in the joint be completely filled with the sealant. In practice, however, it is not easy to meet such desire and there are various problems relating to the application of the sealant.

First, outflow of the sealant from the joint offers problems. It will be understood that to completely fill in the gaps in the joint with the sealant the quantity of the sealant initially applied to the outer panel needs to be somewhat in excess of a just sufficient quantity. Then it is inevitable that at the hemming operation a portion of the sealant is pressed out of the joint, and considerable man-hours are required for wiping off the extruded sealant. Although the amount of extrusion of the sealant can be restricted to some extent by controlling the position of the initial application of the sealant and the quantity of the applied sealant, it is impossible to surely prevent extrusion of the sealant along the entire length of the peripheral joint in an intricately shaped article such as an automobile door. Furthermore, even if the sealant extruded at the hemming stage is wiped off there occurs further outflow of the sealant from the joint at the subsequent stage of curing the electrodeposited coating by baking because of swelling of the heated sealant. Additional and considerable man-hours are required for removal of the sealant extruded at this stage.

For the above reasons, currently it is customary to decrease the quantity of the rust preventive sealant so as to be slightly insufficient for filling in the gaps in the joint formed by hemming. To prevent rusting or corrosion of the panels in the unfilled region of the joint, a coating sealant is applied to the exterior of the folded edge part of the outer panel along the entire length of the peripheral joint after the aforementioned electrodeposition undercoating treatment. However, the application of the coating sealant is not easy and involves various problems. The application of the coating sealant along the entire length of the peripheral joint needs to be completed within a short tact time of the sealant even though the panel assembly has an intricate shape as in the case of an automobile door, so that there is a possibility of locally mislocating the sealant. Even though the joint is completely sealed with the externally coated sealant, corrosion resistance of the unfilled region of the joint becomes questionable during long use of the panel assembly because the moisture permeability of the externally coated sealant is not strictly zero. Furthermore, it is preferable to seal the joint precedent to the pretreatment for the electrodeposition undercoating because otherwise the pretreatment liquid will remain in the space in the joint and will spout from the joint at the stage of bake curing of the undercoat with an adverse effect on the corrosion resistance of the panel surface in some areas near the joint. As a further problem, in some cases it is impractical or very difficult to apply the external coating sealant after the hemming operation. For example, in automobile doors the application of the coating sealant to a hemmed joint in the back of a door hinge is obstructed by the hinge.

SUMMARY OF THE INVENTION

It is an object of the present invention to provide a method of making a rust preventive peripheral joint between two metal panels by hemming working with application of a rust preventive sealant, by which method the above described problems in or relating to the conventional method, including the difficulty of completely filling in the gaps in the joint with the rust preventive sealant, are all resolved and which method is practicable even in intricate regions where application of the conventional external coating sealant is difficult.

To accomplish the above object, the present invention provides a method of making a rust preventive peripheral joint between first and second metal panels, the method comprising the steps of applying a predetermined quantity of a rust preventive sealant to a marginal part of the first panel generally along a free edge of the first panel, placing a marginal part of the second panel in a predetermined position with respect to the marginal part of the first panel, and hemming the marginal part of the first panel along the aforementioned edge so as to hem in the marginal part of the second panel by using a press die member which is formed with a groove in a surface used to hem the first panel such that the groove extends along the edge of the first panel at the end of the hemming operation. The predetermined quantity of the sealant is in excess of a quantity just sufficient for completely filling in gaps in the joint made by the hemming operation so that the excess portion of the sealant is pressed out of the joint by the end of the hemming operation and is confined within a space defined by the groove and is shaped in conformance with the shape of the groove so as to closely cover the edge of the hemmed marginal part of the first panel.

As expressed by the above statement, the method according to the invention is characterized in that intentionally an excess quantity of rust preventive sealant is used to allow the excess portion of the sealant to be pressed out of the joint made by the hemming operation and that the excess portion of the sealant pressed out of the joint is appropriately shaped by the groove formed in the press die member and is utilized for externally sealing the joint.

In the method according to the invention it is natural that gaps in the joint are completely filled with the rust preventive sealant, and no space is left between the sealant existing within the joint and the external seal provided by using the extruded portion of the rust preventive sealant. Therefore, at the usual undercoating treatment of the jointed panel assembly the interior of the joint is not contaminated with the pretreatment liquid. Of course there is no need of removing the sealant pressed out of the joint. Furthermore, an external seal that covers the edge of the hemmed first panel is automatically formed during the hemming operation without need for any extra operation.

The method according to the invention is very suitable for use in the manufacture of automobile doors, hoods and trunk lids.

DETAILED DESCRIPTION OF THE INVENTION

Prior to a detailed description of an embodiment of the invention, a brief description of the prior art supplementary to the previous discussion will be given with reference to FIGS. 3 to 6.

Figure 3:
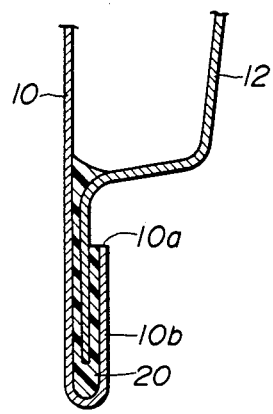
FIG. 3 is a sectional view of a rust preventive peripheral joint between two metal panels and shows a desirable state of the joint when making it by a conventional method.
Figure 4:
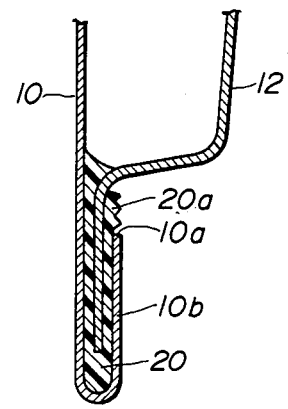
FIG. 4 is a sectional view of a fundamentally similar rust preventive joint and illustrates a problem in a conventional method.

FIG. 3 shows a joint made, for example, along a lower edge of an automobile door. An outer panel 10 of the door is folded along and at a suitable distance from its lower edge 10a so as to hem in a lower marginal part of an inner panel 12. Numeral 20 indicates a rust preventive sealant which was initially applied to the outer panel 10 and was forced to spread over some areas of the two panels as the outer panel 10 was hemmed. It is desirable that the gaps in the joint are completely filled with the sealant 20 without leaving any space between the turn-back part 10b of the outer panel 10 and the inserted inner panel 12 and without extruding from that space. However, it is very difficult to actually meet such desire. Since the quantity of the actually applied sealant 20 must be somewhat in excess of a just sufficient quantity, a portion of the sealant 20 is inevitably pressed out of the joint as shown in FIG. 4. The extruded portion 20a of the sealant must be wiped off even though considerable man-hours are consumed.

Figure 6:
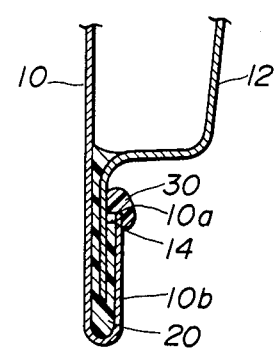
FIG. 6 is a sectional view of a rust preventive peripheral joint made by a conventional method including the process of FIGS. 5(A) to 5(C).
Figure 5A:
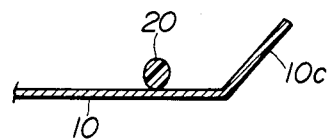
FIGS. 5(A) to 5(C) illustrate a process of making a rust preventive peripheral joint between two metal panels by a conventional hemming method with application of a rust preventive sealant.
Figure 5C:
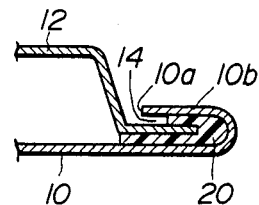
Figure 5B:
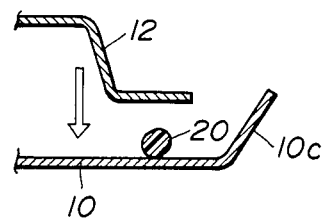

FIG. 5(A) shows application of the rust preventive sealant 20 in the form of a series of beads to the outer panel 10 along and at a suitable distance from a marginal part 10c where the panel 10 will be hemmed. To prevent extrusion of the sealant 20 from the joint in the manner shown in FIG. 4, the quantity of the sealant 20 in FIG. 5(A) is limited so as to be slightly insufficient for completely filling in the gaps in the joint. As shown in FIG. 5(B) the inner panel 12 is brought into the jointing position so that the sealant 20 makes contact with a marginal part of the inner panel 12. As shown in FIG. 5(C), hemming of the outer panel 10 provides a desired joint in which the sealant 20 does not reach the edge 10a of the outer panel 10 and leaves a small space 14 between the turn-back part 10b of the outer panel 10 and the enclosed marginal part of the inner panel 12. As shown in FIG. 6, the space 14 in the joint is sealed by externally applying a coating sealant 30 along the edge 10a of the outer panel 10 so as to extend from the exterior surface of the turn-back part 10b of the outer panel 10 to the external surface of the inner panel 12. The problems relating to the external sealant 30 are as described hereinbefore.

In making a rust preventive joint generally corresponding to the joint shown in FIG. 6 by a method according to the invention, the rust preventive sealant 20 is applied to the outer panel 10 in the manner as shown in FIG. 5(A) and the inner panel 12 is placed in the manner as shown in FIG. 5(B). However, in this method the quantity of the sealant 20 in FIG. 5(A) is controlled so as to be appropriately in excess of a quantity just sufficient for completely filling in the gaps in the joint made by subsequent hemming of the outer panel 10. In other words, it is intended to always allow an appropriate amount of the rust preventive sealant 20 to be pressed out of the joint through the gap between the turn-back part 10b of the outer panel 10 and the enclosed marginal part of the inner panel 12.

The rust preventive sealant 20 can be selected from conventional sealants. An example of very suitable rust preventive sealants is SUNDYNE #2301-7 supplied from Japan Synthetic Rubber Co., which is comprised of a mixture of a normal epoxy resin and a modified epoxy resin, a synthetic rubber, curing agents and rust preventive pigments.

Figure 1:
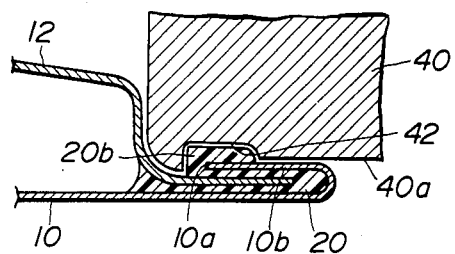
FIG. 1 illustrates, in a sectional view, the manner of the hemming operation in making a rust preventive peripheral joint between two metal panels by a method according to the invention.

In the method according to the invention, as shown in FIG. 1, a press die member 40 used in hemming the outer panel 10 is formed with a groove 42 in the surface 40a which comes into contact with the folded part 10b of the outer panel 10. The groove 42 extends along the edge 10a of the outer panel 10 when the outer panel 10 is hemmed by operating the press. When the intended joint is made by the hemming operation it is natural that the excess portion 20b of the sealant 20 is pressed out of the joint. The groove 42 in the press die member 40 is shaped and sized such that the extruded sealant 20b is confined and appropriately shaped in the space the groove 42 provides. More particularly, the groove 42 is formed such that the extruded sealant 20b can advance over only a short distance from the edge 10a of the hemmed outer panel 10 and then spreads over a limited area of the external surface of the turn-back part 10b of the outer panel 10.

Figure 2:
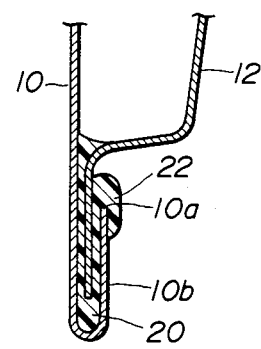
FIG. 2 is a sectional view of a rust preventive joint made by a method according to the invention.

The joint made by the hemming operation illustrated in FIG. 1 is undercoated by an electrodeposition process including a usual pretreatment. It should be noted that the extruded sealant 20b is not removed. Referring to FIG. 2, the heat applied at the bake curing step of the undercoating process causes the rust preventive sealant 20 in the joint to cure and also the extruded portion of the sealant (20*b* in FIG. 1) to cure and turn into an external seal 22, which covers the edge 10*a* of the outer panel 10 and adheres to both the external surface of the marginal part of the inner panel 12 and the external surface of the turn-back part 10*b* of the outer panel 10.

By the method according to the invention the gaps in the joint are surely and completely filled with the rust preventive sealant 20, as will be apparent from the illustration in FIG. 1, and no space is left between the sealant 20 in the joint and the external seal 22 provided by the extruded portion 20*b* of the sealant. Therefore, the interior of the joint is not contaminated with the pretreatment liquid used in the undercoating process, and the joint in the painted panel assembly retains very high resistance to rusting and corrosion.

The external seal 22 is always formed in an optimum position since this seal 22 is formed under the restriction by the grooved press die member 40 without relying on manual working, and this seal 22 can easily be formed even in the case of a joint in an intricate region such as a joint in the back of an automobile door hinge. Besides, a considerable reduction in the production cost will be accomplished since the external seal 22 is automatically formed by the hemming operation to make the joint. That is, the extra operation to form the externally coated seal 30 in FIG. 6 is entirely omitted by the present invention.

What is claimed is:

1. A method of making a rust preventive peripheral joint between first and second metal panels, comprising the steps of:

applying a predetermined quantity of a rust preventive sealant to a marginal part of the first panel generally along a free edge of the first panel;

placing a marginal part of the second panel in a predetermined position with respect to said marginal part of the first panel; and hemming said marginal part of the first panel along said free edge so as to hem in said marginal part of the second panel by using a press die member which is formed with a groove in a surface used to hem the first panel such that said groove extends along said edge of the first panel at the end of the hemming operation, said predetermined quantity of said sealant being in excess of a quantity just sufficient for completely filling in gaps in the joint made by the hemming operation so that the excess portion of said sealant is pressed out of the joint by the end of the hemming operation and is confined within a space defined by said groove and is shaped in conformance with the shape of said groove so as to closely cover said edge of the hemmed first panel.

2. A method according to claim 1, wherein said groove in said press die member is shaped such that the excess portion of said sealant pressed out of the joint adheres to the external surface of the second panel over a limited area and also to the external surface of the hemmed marginal part of the first panel over a limited area.

* * * * *